(12) United States Patent
Austrheim et al.

(10) Patent No.: US 12,161,899 B2
(45) Date of Patent: Dec. 10, 2024

(54) AUTOMATED GRID STORAGE AND RETRIEVAL SYSTEM WITH PASSIVE FIRE PREVENTION ARRANGEMENT

(71) Applicant: Autostore Technology AS, Nedre Vats (NO)

(72) Inventors: Trond Austrheim, Etne (NO); Ivar Fjeldheim, Haugesund (NO)

(73) Assignee: AutoStore Technology AS, Nedre Vats (NO)

( * ) Notice: Subject to any disclaimer, the term of this patent is extended or adjusted under 35 U.S.C. 154(b) by 373 days.

(21) Appl. No.: 17/442,985

(22) PCT Filed: Mar. 23, 2020

(86) PCT No.: PCT/EP2020/057967
§ 371 (c)(1),
(2) Date: Sep. 24, 2021

(87) PCT Pub. No.: WO2020/193470
PCT Pub. Date: Oct. 1, 2020

(65) Prior Publication Data
US 2022/0168601 A1     Jun. 2, 2022

(30) Foreign Application Priority Data
Mar. 25, 2019   (NO) .................................. 20190398

(51) Int. Cl.
*A62C 3/00*       (2006.01)
*A62C 2/18*       (2006.01)
(Continued)

(52) U.S. Cl.
CPC ................ *A62C 3/002* (2013.01); *A62C 2/18* (2013.01); *B65G 1/0464* (2013.01); *A62C 2/22* (2013.01);
(Continued)

(58) Field of Classification Search
CPC ........... A62C 2/18; A62C 2/247; A62C 3/002; B65G 1/0464; B65G 1/065; B65G 2207/22; E04B 1/947; E04B 2/7411
See application file for complete search history.

(56) References Cited

U.S. PATENT DOCUMENTS

| | | |
|---|---|---|
| 4,789,293 A | 12/1988 | Hashimoto et al. |
| 5,642,767 A | 7/1997 | Nair |
| (Continued) | | |

FOREIGN PATENT DOCUMENTS

| | | |
|---|---|---|
| CN | 201835716 U | 5/2011 |
| CN | 106714911 A | 5/2017 |
| (Continued) | | |

OTHER PUBLICATIONS

Office Action issued in the counterpart Chinese Application No. 2020800243844, mailed Mar. 10, 2023 (11 pages).
(Continued)

*Primary Examiner* — James Keenan
(74) *Attorney, Agent, or Firm* — Baker Botts L.L.P.

(57) ABSTRACT

An autonomous grid storage system (1) arranged in a warehouse space (12). The autonomous grid storage system is divided within the warehouse space, for example on a single floor of said space, into a plurality of sub grids (10a/10b) separated by fire walls (18). One or more bridges (14) pass through openings in the fire wall to allow bin handling vehicles (210/301) to traverse between the sub grids. The openings (20) are provided with closable fire door (22).

5 Claims, 17 Drawing Sheets

(51) Int. Cl.
  *B65G 1/04* (2006.01)
  *A62C 2/22* (2006.01)
  *A62C 2/24* (2006.01)
  *B65G 1/06* (2006.01)
  *E06B 3/46* (2006.01)
  *E06B 5/16* (2006.01)

(52) U.S. Cl.
  CPC .............. *A62C 2/247* (2013.01); *B65G 1/065* (2013.01); *B65G 2207/22* (2013.01); *E06B 3/4636* (2013.01); *E06B 5/16* (2013.01)

(56) References Cited

U.S. PATENT DOCUMENTS

| | | | |
|---|---|---|---|
| 2018/0044110 | A1 | 2/2018 | Clarke et al. |
| 2018/0128532 | A1 | 5/2018 | Hognaland |
| 2019/0062064 | A1 | 2/2019 | Ogawa et al. |
| 2022/0041372 | A1* | 2/2022 | Austrheim ........... B65G 1/0464 |
| 2022/0135324 | A1* | 5/2022 | Whelan ................ B65G 1/0464 414/266 |

FOREIGN PATENT DOCUMENTS

| | | |
|---|---|---|
| CN | 106968358 A | 7/2017 |
| CN | 107235280 A | 10/2017 |
| CN | 108996102 A | 12/2018 |
| DE | 2041414 A1 | 3/1971 |
| EP | 1306507 A1 | 5/2003 |
| EP | 3423164 A1 | 1/2019 |
| JP | S57209101 A | 12/1982 |
| JP | S6153981 A | 3/1986 |
| JP | H05178571 A | 7/1993 |
| JP | 2007261729 A | 10/2007 |
| NO | 317366 B1 | 10/2004 |
| TW | 201424793 A | 7/2014 |
| WO | 2014075937 A1 | 5/2014 |
| WO | 2014090684 A1 | 6/2014 |
| WO | 2015104263 A2 | 7/2015 |
| WO | 2015193278 A1 | 12/2015 |
| WO | 17148963 | 9/2017 |
| WO | 2017211634 A1 | 12/2017 |
| WO | 2018033426 A1 | 2/2018 |
| WO | WO-2020109139 A1 * | 6/2020 ............. B65G 1/065 |

OTHER PUBLICATIONS

Office Action issued in Chinese Application No. 2020800243064 mailed on Aug. 3, 2022 (7 pages).
Office Action issued in Chinese Application No. 2020800243844 mailed on Sep. 5, 2022 (10 pages).
Search Report issued in Norwegian Application No. 02190398; Dated Oct. 24, 2019 (2 pages).
International Search Report for corresponding International Application No. PCT/EP2020/057967, mailed Jun. 30, 2020 (5 pages).
Written Opinion for corresponding International Application No. PCT/EP2020/057967, mailed Jun. 30, 2020 (11 pages).
Overhead Door Company of NYC; "Stoebich Fire Door Protection for Conveyor Systems in NYC & NJ"; XP054980560; Mar. 3, 2016; Retrieved from the Internet: URL:https://www.youtube.com/watch?v=5606qB_C8dQ (1 page).

* cited by examiner

Fig. 19
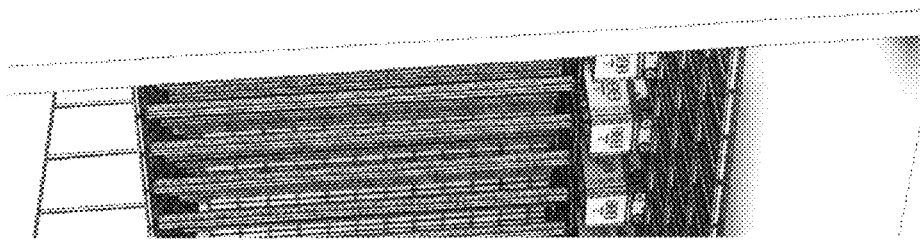

AUTOMATED GRID STORAGE AND RETRIEVAL SYSTEM WITH PASSIVE FIRE PREVENTION ARRANGEMENT

An automated storage and retrieval system that comprises a grid storage system is known in the art. As used herein, the term "autonomous grid storage system" or "grid storage system" or "automated grid storage and retrieval system" and the like means a storage system comprising the following features and elements:

FIG. 1 discloses a typical prior art automated storage and retrieval system 1 with a framework structure 100 and FIGS. 2 and 3 disclose two different prior art bin handling vehicles 201, 301 suitable for operating on such a system 1.

The framework structure 100 comprises a number of upright members/vertical members 102 and a number of horizontal members 103 which can be supported by the vertical members 102 and/or be arranged at the base of the framework structure 100 (not shown). When the horizontal members 103 are arranged at the base of the framework structure 100, they may be arranged in a grid pattern supporting the vertical members 102. The members 102, 103 may typically be made of metal, e.g. extruded aluminium profiles.

The framework structure 100 defines a storage grid structure 104 comprising storage columns 105 arranged in rows. In these storage columns 105, storage bins 106 (also known as storage containers) are stacked one on top of another to form stacks 107. The storage grid structure 104 guards against horizontal movement of the stacks 107 of storage bins 106, and guides vertical movement of the bins 106, but normally does not otherwise support the storage bins 106 when they are stacked.

The automated storage and retrieval system 1 comprises a rail system 108 arranged in a grid pattern across the top of the storage grid structure 104, on which rail system 108 a plurality of bin handling vehicles 201, 301 are operated to raise storage bins 106 from, and lower storage bins 106 into, the storage columns 105, and also to transport the storage bins 106 above the storage columns 105. The rail system 108 comprises a first set of parallel rails 110 arranged to guide movement of the bin handling vehicles 201, 301 in a first direction X across the top of the frame structure 100, and a second set of parallel rails 111 arranged perpendicular to the first set of rails 110 to guide movement of the bin handling vehicles 201, 301 in a second direction Y which is perpendicular to the first direction X. In this way, the rail system 108 defines grid columns 112 above which the bin handling vehicles 201, 301 can move laterally above the storage columns 105, i.e. in a plane which is parallel to the horizontal X-Y plane.

Each prior art bin handling vehicle 201, 301 comprises a vehicle body 201a, 301a, and first and second sets of wheels 201b, 301b, 201c, 301c which enable the lateral movement of the bin handling vehicles 201, 301 in the X direction and in the Y direction, respectively. In FIGS. 2 and 3 two wheels in each set are fully visible. The first set of wheels 201b, 301b is arranged to engage with two adjacent rails of the first set of rails 110, and the second set of wheels 201c, 301c is arranged to engage with two adjacent rails of the second set of rails 111. Each set of wheels 201b, 301b 201c, 301c can be lifted and lowered, so that the first set of wheels 201b, 301b and/or the second set of wheels 201c, 301c can be engaged with the respective set of rails 110, 111 at any one time.

Each prior art bin handling vehicle 201, 301 also comprises a lifting device (not shown) for vertical transportation of storage bins 106, e.g. raising a storage bin 106 from, and lowering a storage bin 106 into, a storage column 105. The lifting device comprises one or more gripping/engaging devices 303 which are adapted to engage a storage bin 106. The gripping/engaging devices 303 can be lowered from the vehicle 201, 301 so that the position of the gripping/engaging devices 303 with respect to the vehicle 201, 301 can be adjusted in a third direction Z which is orthogonal to the first direction X and the second direction Y. Further details with regard to the lifting device are described in e.g. WO 2017/211634 A1, the contents of which are incorporated herein by reference.

Conventionally, and also for the purpose of this application, Z=1 identifies the uppermost layer of the storage grid structure 104, i.e. the layer immediately below the rail system 108, Z=2 the second layer below the rail system 108, Z=3 the third layer below the rail system 108 etc. In the exemplary prior art storage grid structure disclosed in FIG. 1, Z=8 identifies the lowermost, bottom layer of the storage grid structure 104. Similarly, X=1 . . . n and Y=1 . . . n identifies the position of each grid column 112 in the horizontal plane. Consequently, as an example, and using the Cartesian coordinate system X, Y, Z indicated in FIG. 1, the storage bin identified as 106' in FIG. 1 can be said to occupy grid location or cell X=10, Y=2, Z=3. The bin handling vehicles 201, 301 can be said to travel in layer Z=0, and each grid column 112 can be identified by its X and Y coordinates.

Each prior art bin handling vehicle 201, 301 comprises a storage compartment or space for receiving and stowing a storage bin 106 when transporting the storage bin 106 across the rail system 108. The storage space may comprise a cavity arranged centrally within the vehicle body 201a as shown in FIG. 2 and as described in e.g. WO 2015/193278 A1 and WO 2018/033426 A1, the contents of which are incorporated herein by reference.

FIG. 3 shows an alternative configuration of a bin handling vehicles 301 with a cantilever construction. Such a vehicle is described in detail in e.g. NO317366, the contents of which are also incorporated herein by reference.

The central cavity bin handling vehicles 201 shown in FIG. 2 may have a footprint that covers an area with dimensions in the X and Y directions which is generally equal to the lateral extent of a grid column 112, i.e. the extent of a grid column 112 in the X and Y directions, e.g. as is described in WO 2015/193278 A1, the contents of which are incorporated herein by reference. The term 'lateral' used herein may mean 'horizontal'.

Alternatively, the central cavity bin handling vehicles 201 may have a footprint which is larger than the lateral area defined by a grid column 112, e.g. as is disclosed in WO 2014/090684 A1.

The rail system 108 may be a single rail system, as is shown in FIG. 4. Alternatively, the rail system 108 may be a double rail system, as is shown in FIG. 5, thus allowing a bin handling vehicle 201 having a footprint generally corresponding to the lateral area defined by a grid column 112 to travel along a row of grid columns even if another bin handling vehicle 201 is positioned above a grid column neighbouring that row. Both the single and double rail system, or a combination comprising a single and double rail arrangement in a single rail system 108, form a grid pattern in the horizontal plane P comprising a plurality of rectangular and uniform grid locations or grid cells 122, where each grid cell 122 comprises a grid opening 115 being delimited by a pair of rails 110a, 110b of the first set of rails 110 and a pair of rails 111a, 111b of the second set of rails 111. In FIG. 5 the grid cell 122 is indicated by a dashed box.

Consequently, rails 110a and 110b form pairs of rails defining parallel rows of grid cells running in the X direction, and rails 111a and 111b form pairs of rails defining parallel rows of grid cells running in the Y direction.

As shown in FIG. 6, each grid cell 122 has a width $W_c$ which is typically within the interval of 30 to 150 cm, and a length $L_c$ which is typically within the interval of 50 to 200 cm. Each grid opening 115 has a width $W_o$ which is typically 2 to 10 cm less than the width $W_c$ of the grid cell 122. Each grid opening 115 has a length $L_o$ which is typically 2 to 10 cm less than the length $L_c$ of the grid cell 122.

In the X and Y directions, neighbouring grid cells are arranged in contact with each other such that there is no space between neighbouring grid cells.

In a storage grid structure 104, a majority of the grid columns 112 are storage columns 105, i.e. grid columns 105 where storage bins 106 are stored in stacks 107. However, a storage grid structure 104 normally has at least one grid column 112 which is not used for storing storage bins 106, but which comprises a location where the bin handling vehicles 201, 301 can drop off and/or pick up storage bins 106 so that they can be transported to an access station (not shown) where the storage bins 106 can be accessed from outside of the storage grid structure 104 or transferred out of, or into the storage grid structure 104. Within the art, such a location is normally referred to as a 'port' and the grid column 112 in which the port is located may be referred to as a 'port column' 119, 120. The transportation to the access station may be in any direction, that is horizontal, tilted and/or vertical. For example, the storage bins 106 may be placed in a random or dedicated grid column 112 within the storage grid structure 104, then picked up by any bin handling vehicle and transported to a port 119, 120 for further transportation to an access station. Note that the term 'tilted' means transportation of storage bins 106 having a general transportation orientation somewhere between horizontal and vertical.

The storage grid structure 104 in FIG. 1 comprises two port columns 119 and 120. The first port column 119 may for example be a dedicated drop-off port column where the bin handling vehicles 201, 301 can drop off storage bins 106 to be transported to an access station or a transfer station, and the second port column 120 may be a dedicated pick-up port column where the bin handling vehicles 201, 301 can pick up storage bins 106 that have been transported to the storage grid structure 104 from an access station or a transfer station.

The access station may typically be a picking station or a stocking station where product items are removed from or positioned into the storage bins 106. In a picking station or a stocking station, the storage bins 106 are normally never removed from the automated storage and retrieval system 1, but are returned into the storage grid structure 104 once accessed. A port 119, 120 can also be used for transferring storage bins out of or into the grid 104, e.g. for transferring storage bins 106 to another storage facility (e.g. to another grid or to another automated storage and retrieval system), to a transport vehicle (e.g. a train or a lorry), or to a production facility.

A conveyor system comprising conveyors is normally employed to transport the storage bins between the ports 119, 120 and the access station.

In an alternative embodiment, dedicated bin transport vehicles may operate on a lower level to transport bins from ports to an access station.

If the ports 119, 120 and the access station are located at different levels, the conveyor system may comprise a lift device with a vertical component for transporting the storage bins 106 vertically between the port 119, 120 and the access station.

The conveyor system may be arranged to transfer storage bins 106 between different grids, e.g. as is described in WO 2014/075937 A1, the contents of which are incorporated herein by reference.

When a storage bin 106 stored in the grid 104 disclosed in FIG. 1 is to be accessed, one of the bin handling vehicles 201, 301 is instructed to retrieve the target storage bin 106 from its position in the storage grid structure 104 and transport it to the drop-off port 119. This operation involves moving the bin handling vehicle 201, 301 to a grid location above the storage column 105 in which the target storage bin 106 is positioned, retrieving the storage bin 106 from the storage column 105 using the bin handling vehicle's 201, 301 lifting device (not shown), and transporting the storage bin 106 to the drop-off port 119. If the target storage bin 106 is located deep within a stack 107, i.e. with one or a plurality of other storage bins 106 positioned above the target storage bin 106, the operation also involves temporarily moving the above-positioned storage bins prior to lifting the target storage bin 106 from the storage column 105. This step, which is sometimes referred to within the art as "digging", may be performed with the same bin handling vehicle 201, 301 that is subsequently used for transporting the target storage bin 106 to the drop-off port 119, or with one or a plurality of other cooperating bin handling vehicles 201, 301. Alternatively, or in addition, the automated storage and retrieval system 1 may have bin handling vehicles 201, 301 specifically dedicated to the task of temporarily removing storage bins 106 from a storage column 105. Once the target storage bin 106 has been removed from the storage column 105, the temporarily removed storage bins 106 can be repositioned into the original storage column 105. However, the removed storage bins 106 may alternatively be relocated to other storage columns 105.

When a storage bin 106 is to be stored in the storage grid structure 104, one of the bin handling vehicles 201, 301 is instructed to pick up the storage bin 106 from the pick-up port 120 and transport it to a grid location above the storage column 105 where it is to be stored. After any storage bins positioned at or above the target position within the storage column stack 107 have been removed, the bin handling vehicle 201, 301 positions the storage bin 106 at the desired position. The removed storage bins 106 may then be lowered back into the storage column 105 or relocated to other storage columns 105.

The automated storage and retrieval system 1 comprises a control system for monitoring and controlling the automated storage and retrieval system 1, e.g. for monitoring and controlling the location of respective storage bins 106 within the storage grid structure 104, monitoring the content of each storage bin 106, and monitoring and controlling the movement of the bin handling vehicles 201, 301 so that a desired storage bin 106 can be delivered to the desired location at the desired time without the bin handling vehicles 201, 301 colliding with each other. The control system is typically computerized and typically comprises a database for keeping track of the storage bins 106.

The automated storage and retrieval system 1 may comprise bin handling vehicles, charging station(s) for charging the bin handling vehicles and a wireless communication system. Such features are also known from WO 2015/104263 A1, which is incorporated herein by reference.

In an embodiment of a grid storage system, a bin lift device for transporting bins in a vertical direction may be employed if a storage grid structure 104 is placed underneath another storage grid structure 104 as known from WO 2014/075937 A1, which is incorporated herein by reference.

Fire Hazard

As is evident from the discussion above, a grid storage system has many advantages over a traditional storage warehouse. A principal advantage is that a grid storage system more efficiently utilizes the available warehouse space, with items being stored in a particularly dense arrangement. However, there is also a desire to provide a warehouse with a grid storage system arrangement that can reduce the risk of damage to the warehouse and its contents in the event of a fire.

SUMMARY OF THE INVENTION

The present invention is set forth and characterized in the independent claims, while the dependent claims describe preferred or optional features of the invention. The present invention provides a warehouse with a grid storage system that is designed to contain a fire in a manageable, segregated section of the warehouse.

In various embodiments, the invention comprises an autonomous grid storage system arranged in a warehouse space. The warehouse may comprise a space having a single floor or may be arranged on a plurality of floors.

The autonomous grid storage system is divided within the warehouse space, for example on a single floor of said space, into a plurality of sub grids separated by fire walls. As used herein, the terms "firewall" shall also encompass the terms "fire barrier" and "fire partition", and means a structure designed and intended as part of a building's passive fire protection system, as those terms are understood in the art and according to applicable national and international fire prevention standards, such as for example NFPA 221 and/or ICC IBC 2018 chapter 7.

The sub grids may according to one aspect be separated from the walls of the warehouse, including the fire walls, by aisles devoid of grid framework or storage bins. Such aisles may effectively function as a fire break in the event of fire and may also provide access to firefighting personnel and equipment. In another aspect the grid structure of the sub grids may essentially entirely fill the spaces in which the sub grids are arranged by extending the grid structure to close proximity to the walls of the warehouse, including the fire walls.

One or more bridges is/are arranged between adjacent sub grids to allow bin handling vehicles to traverse between the sub grids. The bridges comprise one or more sets of parallel rails 110 connecting the rail systems 108 of adjacent sub grids, such that bins handling vehicles may traverse over the bridges from the rail system of one sub grid to the rail system of an adjacent sub grid. Bridges may be useful where, for example, a port for lowering bins to an access station or conveyor is located in one but not all of the sub grids. The vehicles can thus travel over the bridge to the port despite the grid system being divided into sub grids. Such bridges may be arranged in many ways, for example with varying widths to accommodate a plurality of simultaneous vehicles passing over the bridge.

In such an embodiment, a passage with a closable fire door is arranged in the fire wall at the location of each bridge. The term "fire door" is to be understood to mean a fire door designed and intended as part of a building's passive fire prevention system, complying with applicable national and international standards, such as for example NFPA and/or ICC IBC 2018 chapter 7.

The fire door or doors in one embodiment are slidable doors. In one embodiment, the slidable doors are weighted doors, held in an open position by a latch or magnet during ordinary operation of the grid storage system. In the event of a fire, an alarm triggers the release of the latches or magnets, whereupon the weight of the doors causes the doors to slide into the closed position, effectively isolating the sub grids from each other behind the fire walls. It should be understood, however, that other arrangements of closable fire doors are possible, such as doors that swing on hinges, doors that slide vertically up and down to open and close the passage, doors that are arranged as two sections connected by a common pivot point above the passage, and arranged to swing open and closed about the pivot point etc. The doors may likewise comprise a flexible fireproof material instead of a rigid door.

In one embodiment, the grid storage system comprises dedicated transport vehicles that operate on a first level, arranged to transport bins lowered through a port to another location, for example to an access station. In this embodiment, the dedicated transport vehicles pass through openings in a fire wall having closable fire doors. In alternative versions of this embodiment, the sub grids may or may not be connected by bridges for the bin handling vehicles. In the version without bridges, each sub grid may have its own port though which bins are lowered to the transport vehicles. In the version with bridges, the storage system may have one or more ports restricted to a single, or limited number of sub grids.

As can be appreciated, in the event a fire is detected in the warehouse space, an alarm may be triggered which releases the fire doors. A fire will thus be contained to a more manageable section of the warehouse space, assisting in any firefighting operation and reducing the risk of total loss for the facility.

The above arrangement of the storage system maybe combined with additional, active fire prevention and firefighting apparatus, such as emergency lighting, heat detectors, sprinkler systems, introduction of inert gas or other measures. In one embodiment, the sprinkler system may be an intelligent system that activates only in the section of the warehouse space in which fire is detected. Since the storage system in divided into sections behind firewalls, the unaffected sections of the storage facility can thus hopefully avoid water damage due to the sprinkler system activating over the entire facility.

BRIEF DESCRIPTION OF THE DRAWINGS

The following drawings are appended to facilitate the understanding of the invention. The drawings show embodiments of the invention, which will now be described by way of example only, where:

FIGS. 18 and 19 are close up views of the grid storage system from FIGS. 16 and 17 respectively.

DETAILED DESCRIPTION OF THE INVENTION

Figure 1:
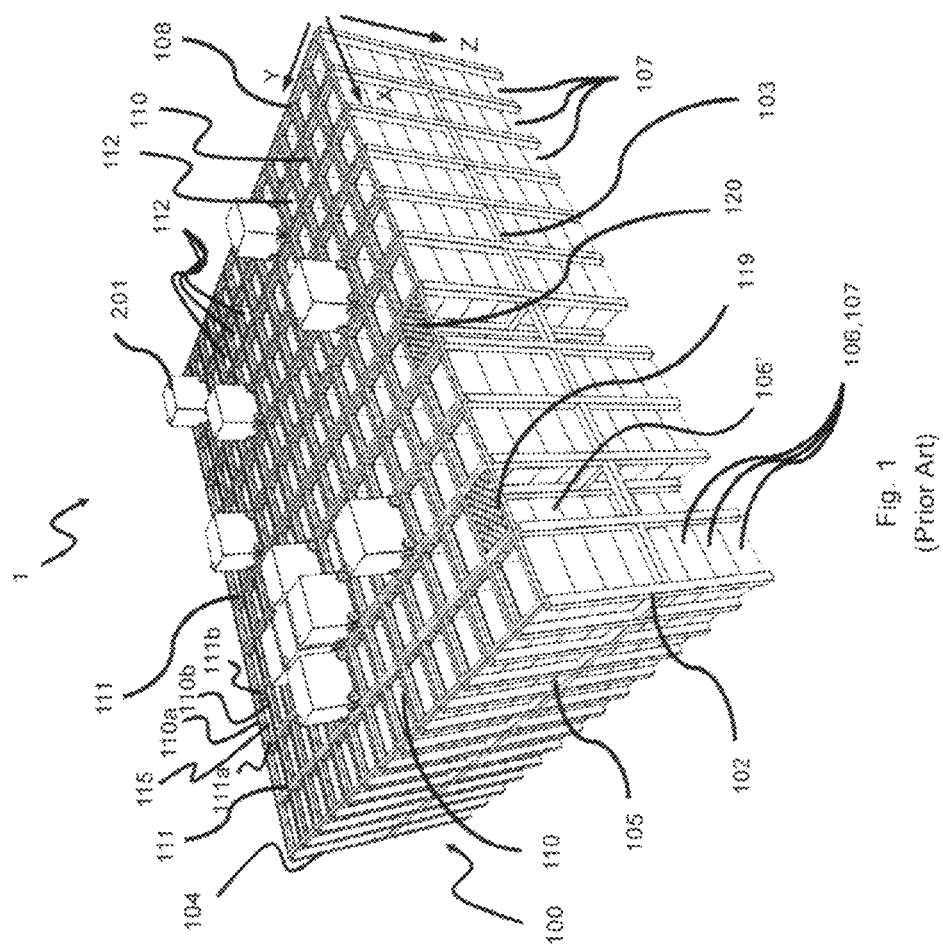
FIG. 1 is a perspective view of a prior art automated grid storage and retrieval system.
Figure 3:
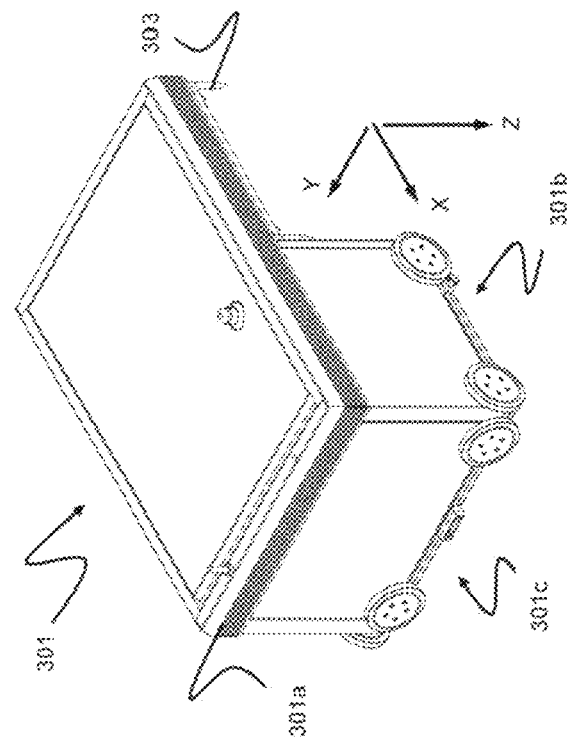
FIG. 3 is a perspective view of a prior art bin handling vehicle having a cantilever for containing storage bins underneath.
Figure 2:
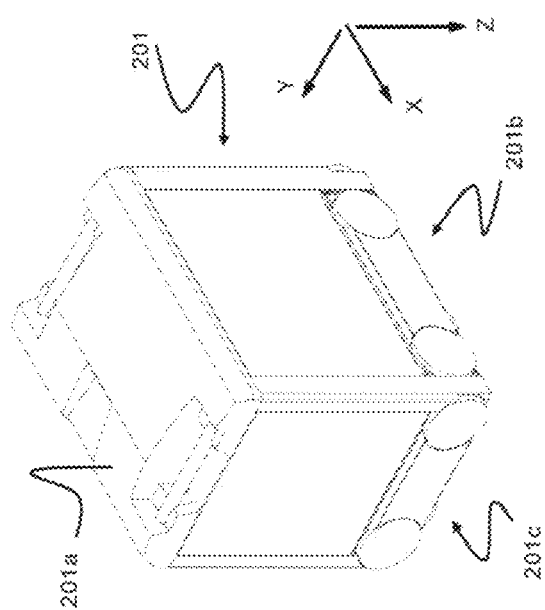
FIG. 2 is a perspective view of a prior art bin handling vehicle having a centrally arranged cavity for containing storage bins therein.
Figure 5:
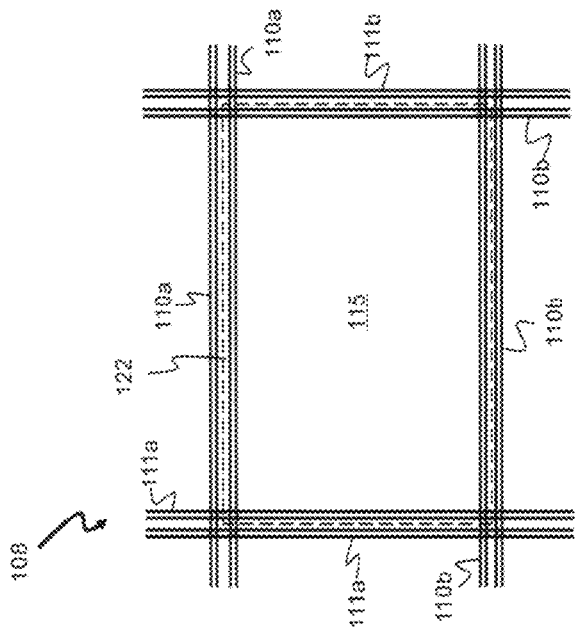
FIG. 5 is a top view of a prior art double rail grid.
Figure 4:
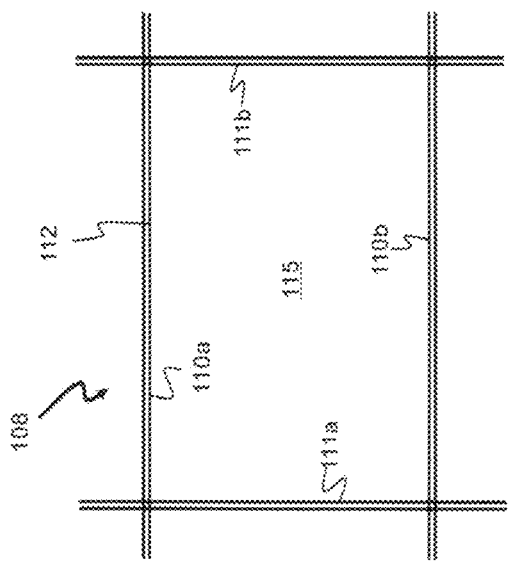
FIG. 4 is a top view of a prior art single rail grid.
Figure 6:
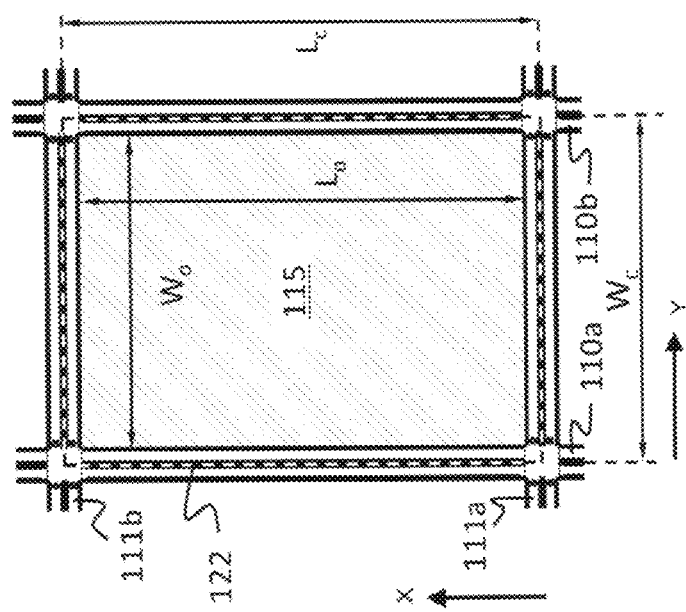
FIG. 6 is a top view of a rail system of the automated grid storage and retrieval system according to FIG. 1.

FIGS. 1-6 collectively illustrate an autonomous grid storage system as known in the prior art, such as, for example, the Autostore® system of the present applicant. As shown in FIG. 1, a salient feature is such a system is the dense, efficient utilization of as much of a usable space in a warehouse area as possible.

Figure 7:
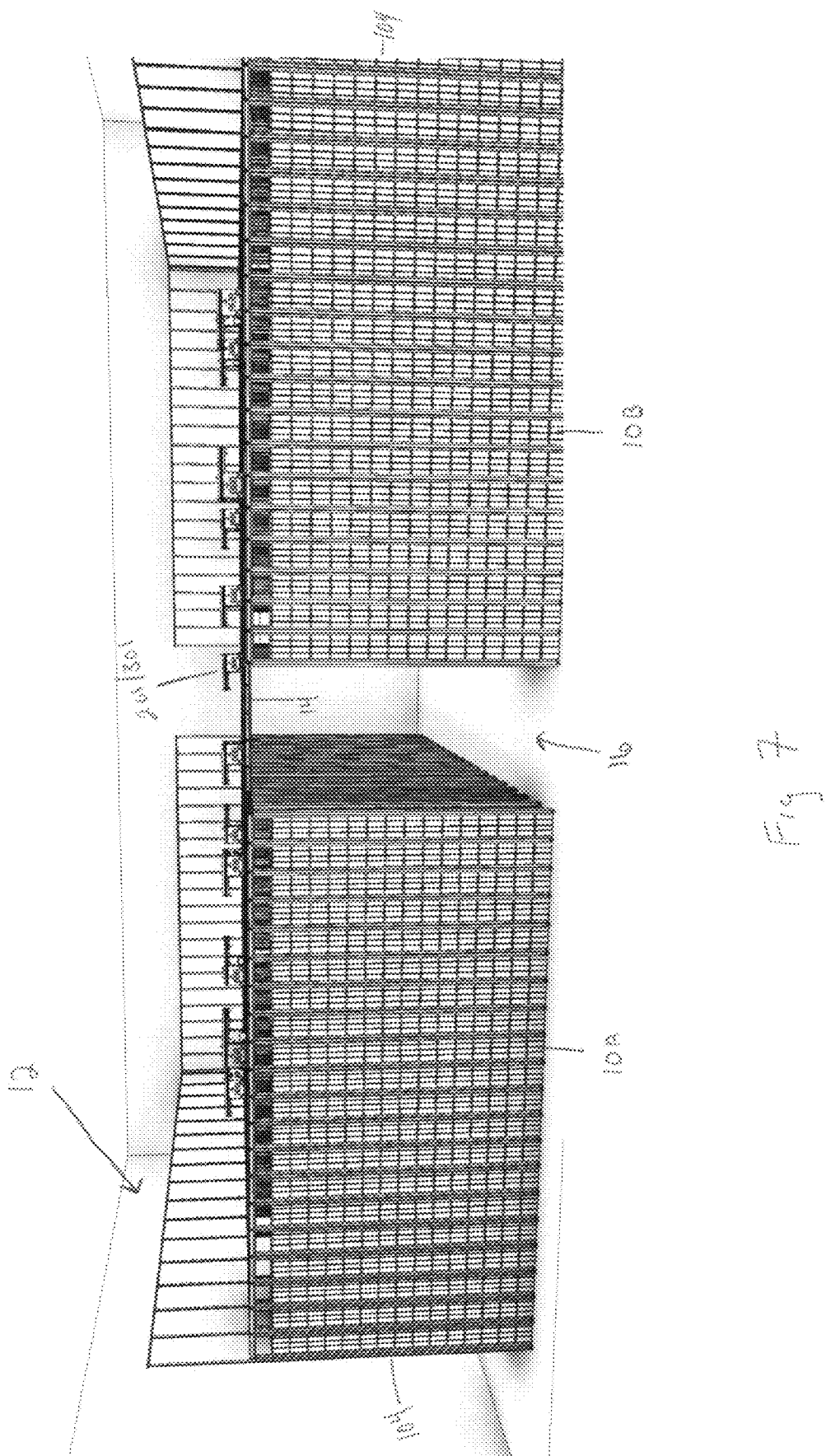
FIG. 7 is a perspective view of a grid storage system divided into two sub grids.

According to the present invention, fire safety is improved by dividing the storage grid into a plurality of sub grids. FIG. 7 shows two sub grids 10A and 10B arranged in a warehouse space 12. While FIG. 7 illustrates two sub grids, it should be understood that the storage system can be divided into any number of sub grids, depending on the size of warehouse space 12, fire safety regulations mandating grid size, or other considerations. As further illustrated in FIG. 7, bin handling vehicles 201/301 operated at the upper level of the storage grid structure 104, and travel between sub grids 10A and 10B over one or more bridges 14.

Figure 8:
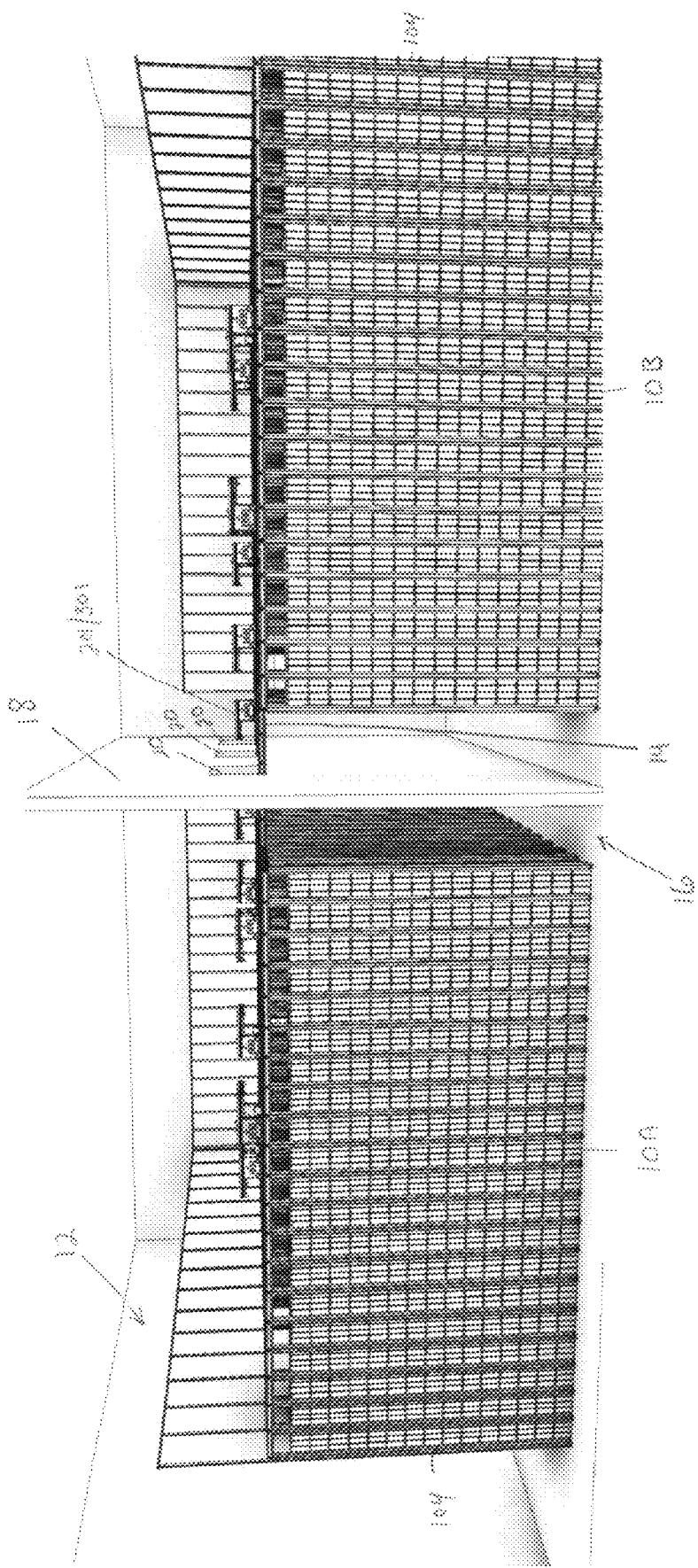
FIG. 8 is a perspective view of a grid storage system divided into two sub grids, separated by a fire wall.

In one embodiment of the invention, illustrated in FIG. 8, the sub grids 10A and 10B are separated by a fire wall, barrier or partition 18 (hereafter collectively referred to as a firewall). The firewall is arranged such that an aisle 16 is intermediate the grid structure and the firewall. The aisle may function as a fire break, as well as providing access to firefighting personnel and equipment. The grid structure may extend essentially adjacent to the firewall however. One or more bridge or bridges 14 pass through one or more openings 20 in fire wall 18. Fire wall 18 has dimensions and is manufactured of a suitable fire preventive material according to known techniques in the art of fire prevention and according to applicable national and international standards, such as ICC IBC 2018 for example.

Figure 9:
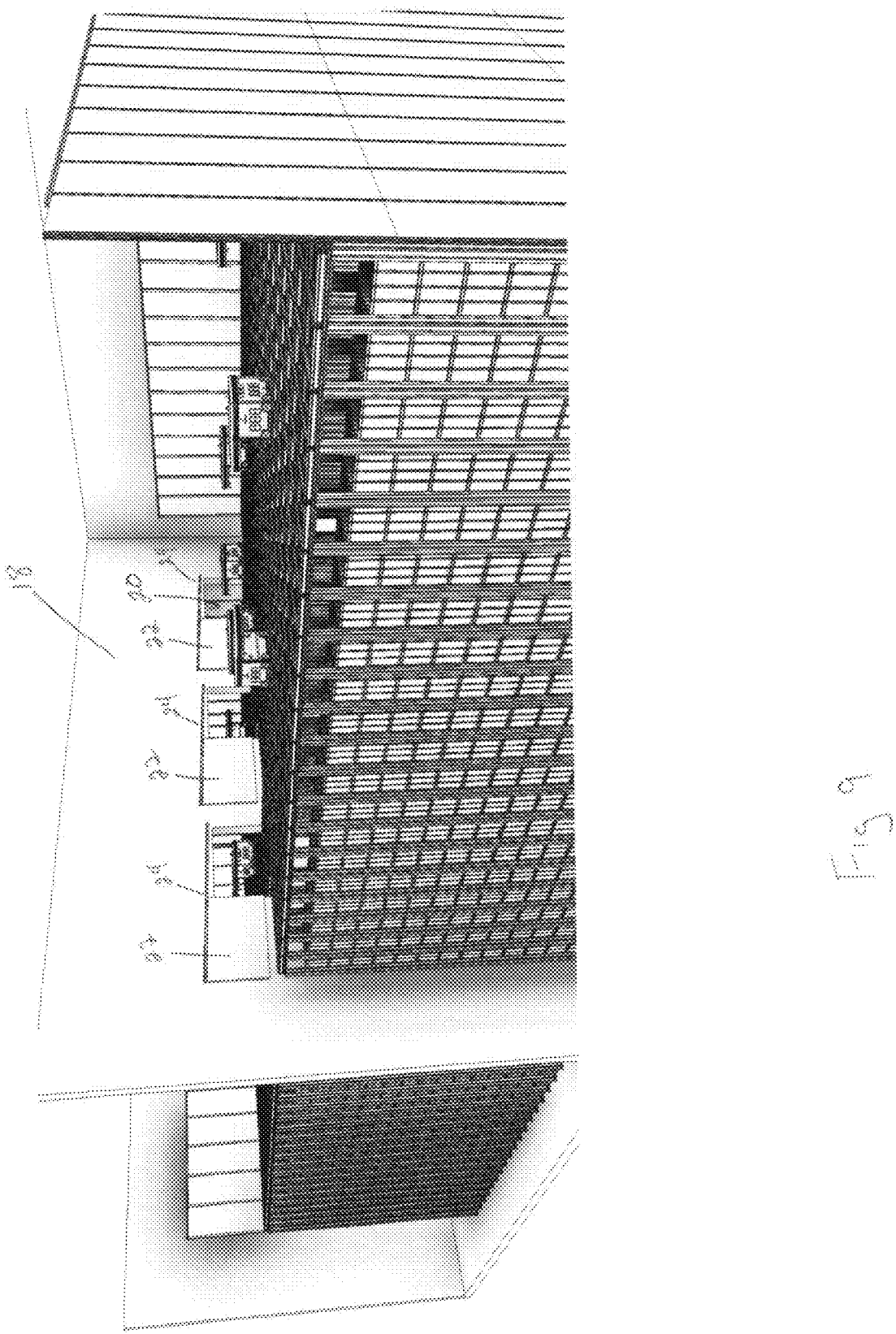
FIG. 9 is a perspective view of a grid storage system as depicted in FIG. 8, showing fire doors in open positions.
Figure 10:
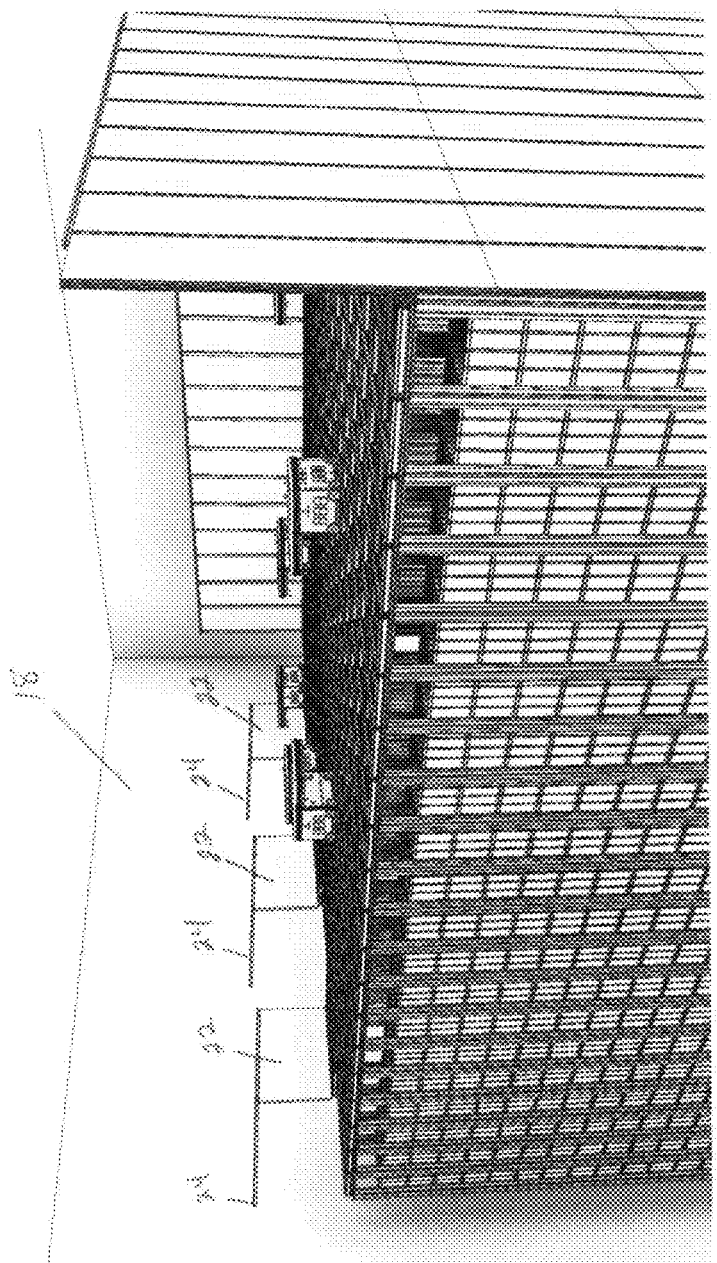
FIG. 10 is a perspective view of a grid storage system as depicted in FIG. 8, showing fire doors in closed positions.
Figure 11:
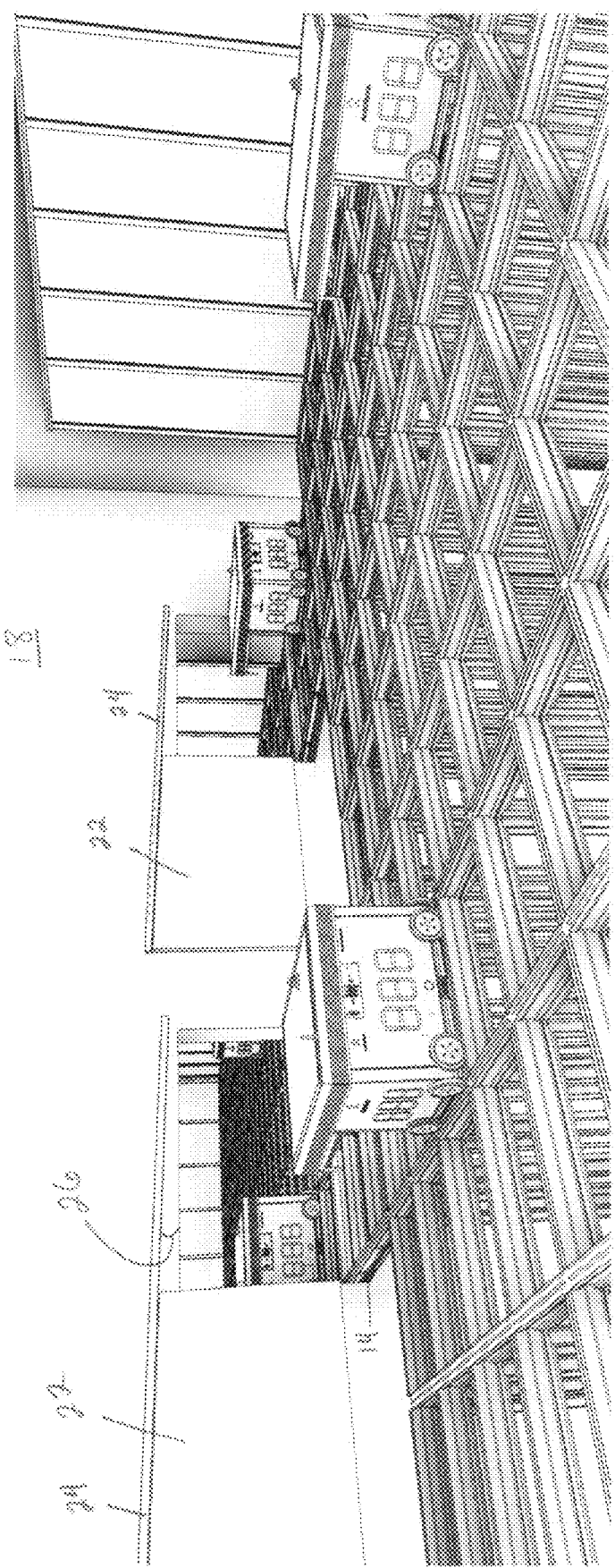
FIG. 11 is a close up view of fire doors in open positions.
Figure 12:
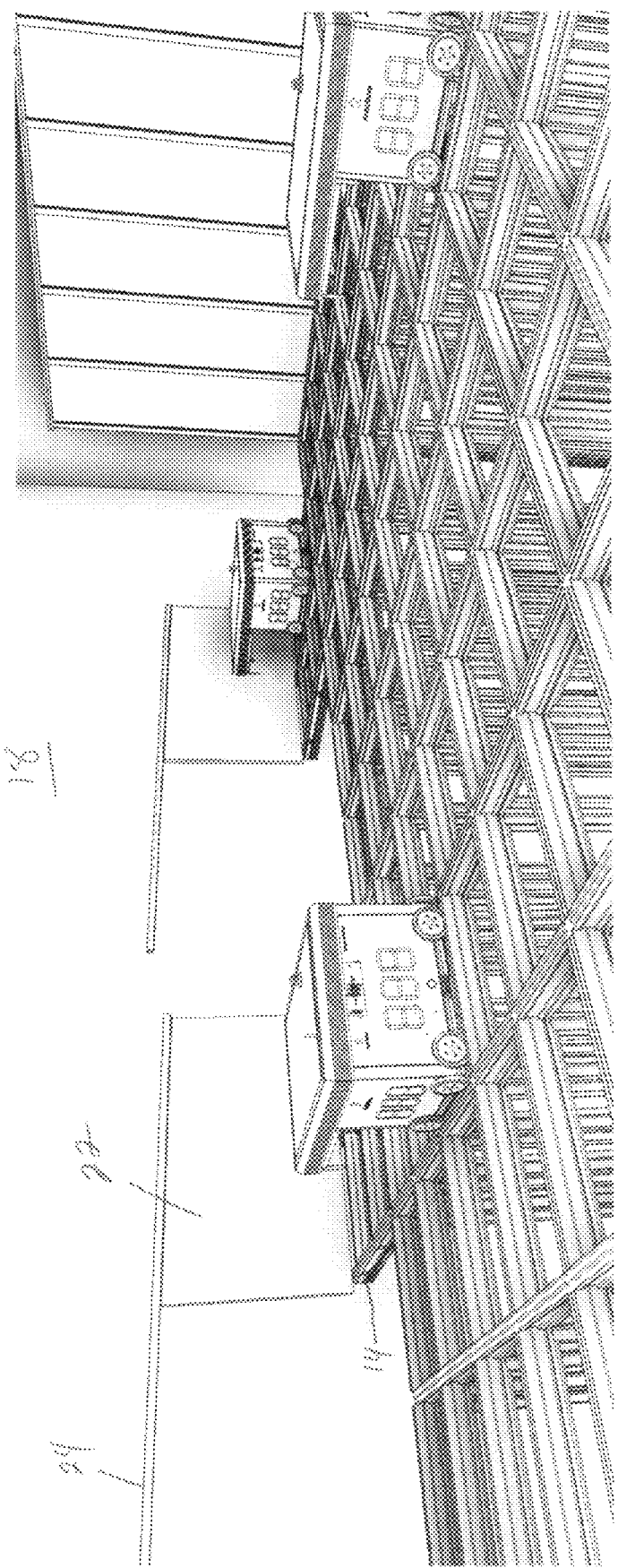
FIG. 12 is a close up view of fire doors in closed positions.

As seen in FIG. 9, openings 20 may be selectively closed by a closable fire door, such as for example sliding fire doors 22. In one embodiment, fire doors 22 are sliding doors, arranged to slide along rails 24 though other arrangements are possible within the scope of the invention. FIG. 9 shows the fire doors 22 in an open position, while FIG. 10 shows fire doors 22 in a closed position. As seen in an embodiment illustrated in FIG. 11, rails 24 are arranged at an angle 26, such that the weight of the doors themselves cause the doors to slide under the influence of gravity from the open to the closed position. In this embodiment, the fire doors may be held in the open position (as seen in FIG. 11) during normal operation of the storage system by a latch or magnet (not shown). In the event a fire is detected, the latch or magnet may be released, allowing the doors to slide to the closed position (as seen in FIG. 12) due to their own weight. The fire doors may comprise sealing means for effectively sealing against the tracks of bridges 14 where necessary to meet applicable fire rating standards for fire doors.

Figure 13:
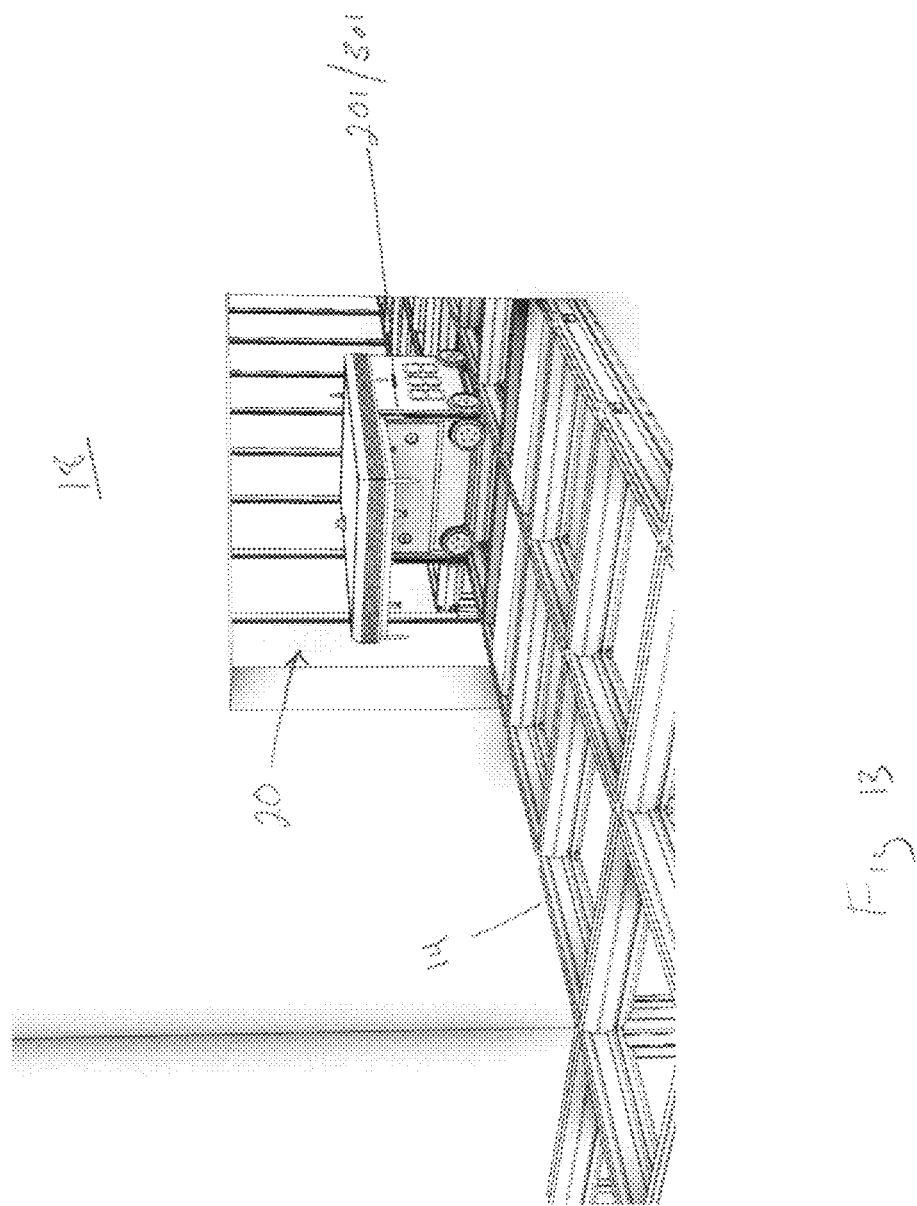
FIG. 13 is a close up view of a vehicle bridge, a vehicle and a single fire door in an open position.
Figure 14:
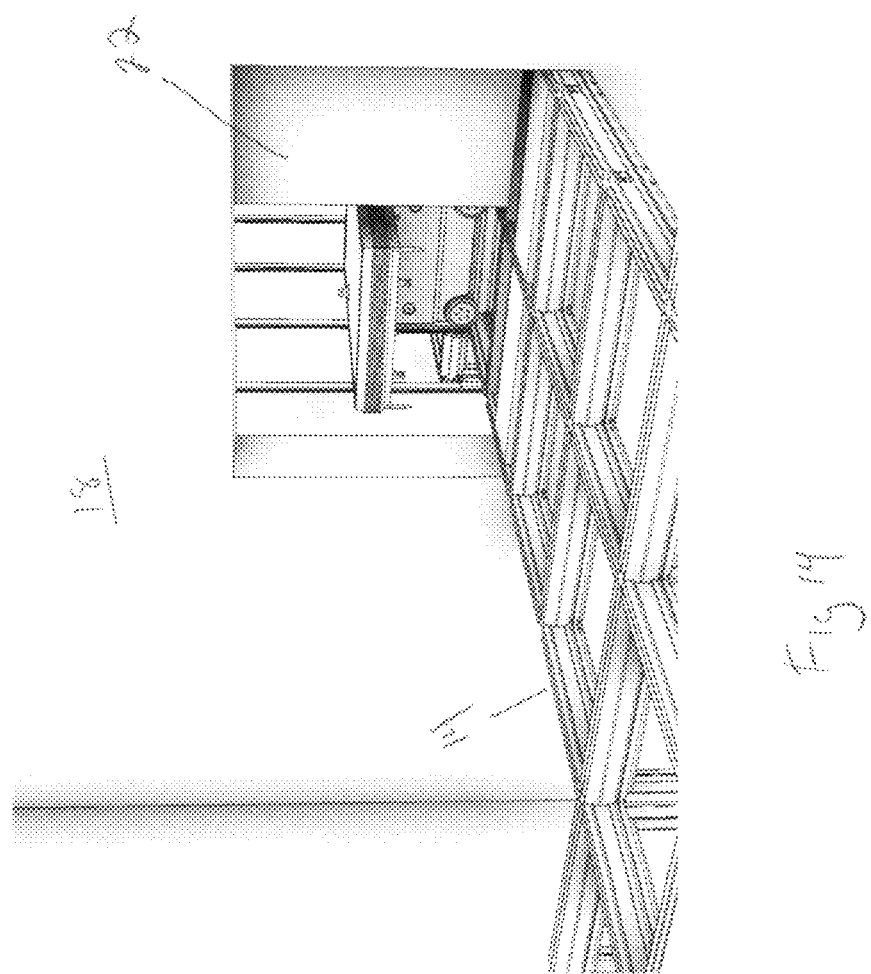
FIG. 14 is a close up view of a vehicle bridge, a vehicle and a single fire door in an semi closed position.
Figure 15:
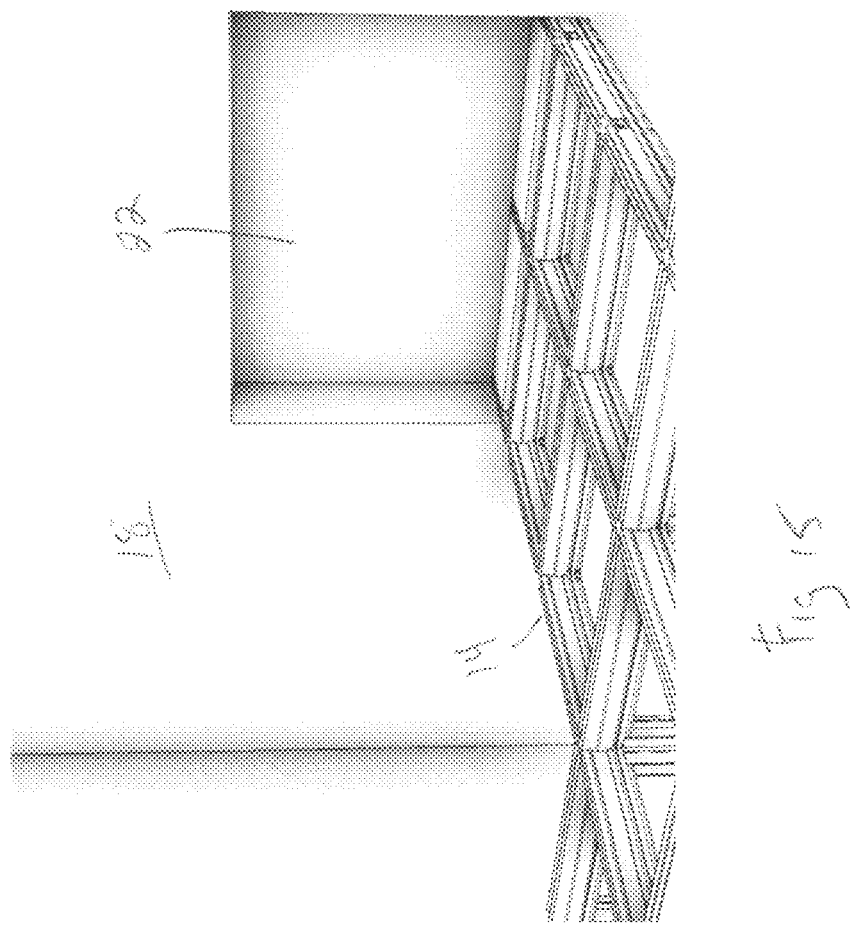
FIG. 15 is a close up view of a vehicle bridge and a single fire door in a closed position.
Figure 16:
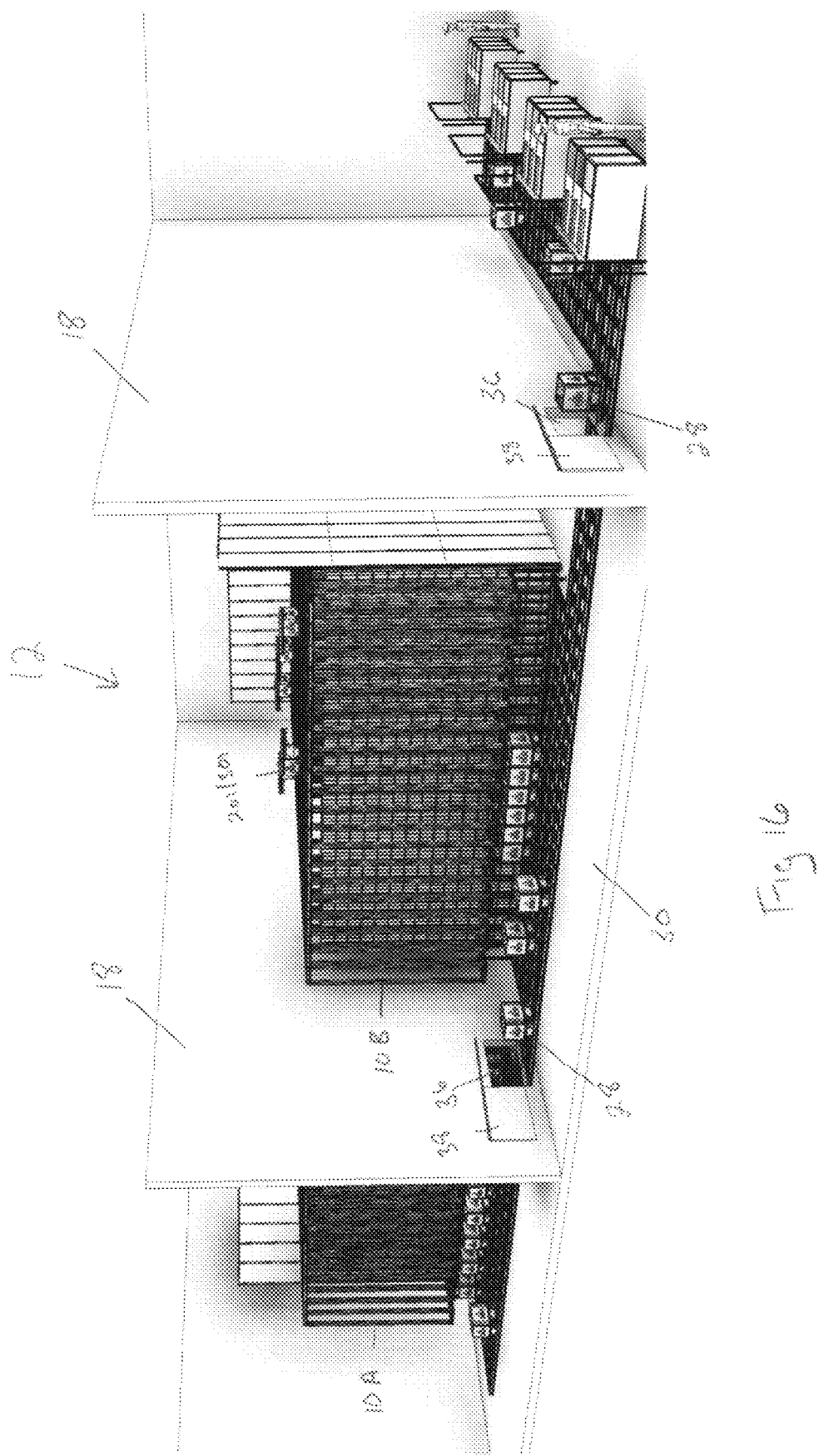
FIG. 16 is a perspective view of a grid storage system divided into two sub grids, separated by fire walls, in which dedicated transport vehicles operate on a ground level through closable fire doors in an open position.
Figure 17:
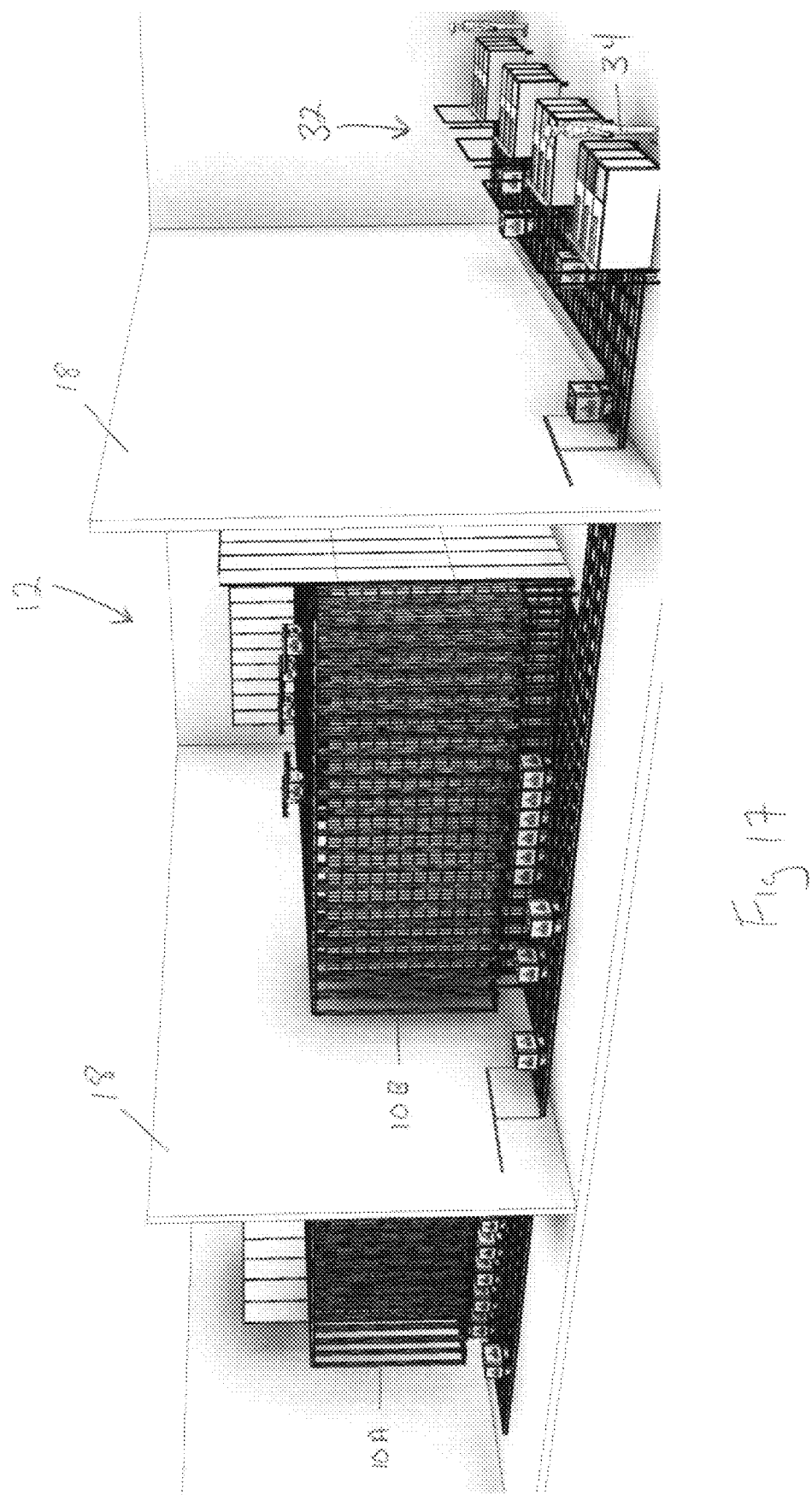
FIG. 17 is a perspective view of the grid storage system from FIG. 16, with fire doors in closed positions.
Figure 18:
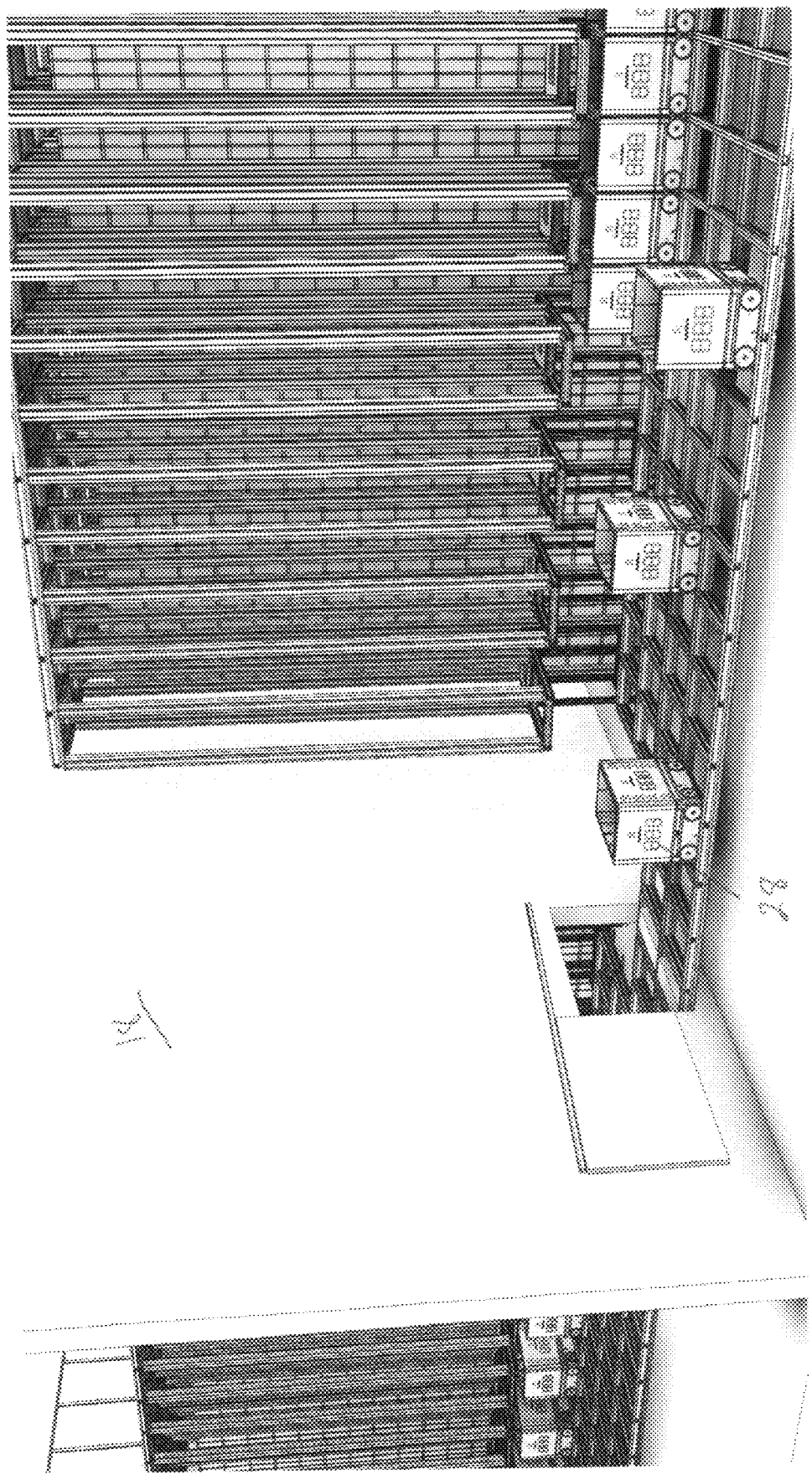

FIG. 13. Illustrates an embodiment where bridge 14 is double width, comprises tracks for two vehicles 201/301 to pass through opening 20 simultaneously. The bridge may be a single track, or any integer (for example, three, four or five vehicle tracks) that is deemed expeditious. FIG. 14 shows partially closed, thus blocking one of two vehicle tracks on bridge 14. FIG. 15 shows fire door 22 fully closed.

FIGS. 16-19 illustrate an embodiment of the invention a plurality of dedicated container delivery vehicles 28 operate on a lower level 30 of the grid storage system.

Delivery vehicles 28 transport containers that have been lowered from the top of the sub grids (for example by integrated lifting means in vehicles 201/301, or by a separate bin lift). Transport vehicles 28 may, for example, transport containers to an access station 32, where containers are accessed by an operator 34 for removal or replacement of items from containers.

As shown in FIGS. 16-19, this embodiment also comprises a fire wall 18 arranged between adjacent sub grids. Fire wall 18 comprises one or more openings 36 through which the transport vehicles 28 may pass. Closable fire doors, for example slidable doors 38, are arranged to selectively close openings 36 in the event of a fire. As with the case with the previously described embodiments, the doors may be slidably arranged on slanted rails, whereby the weight of the doors will cause the doors to slide closed under the influence of gravity. As with the previously described embodiment, the doors 38 may be held open by a releasable latch or magnet during normal operation, such latch or magnet being released in the event of fire. The embodiment shown in FIGS. 16-19 may alternately also comprise bridges between sub grids as in the previously described embodiments.

It is to be understood that the embodiments described and illustrated herein are merely exemplary, and one skilled in the art may arrange the sub grids, fire walls, bridges etc in other configurations within the scope of the invention.

REFERENCE NUMERALS

1 Storage and retrieval system (prior art)
100 Framework structure
102 Upright members/vertical members of framework structure
103 Horizontal members of framework structure
104 Storage grid structure
105 Storage column
106 Storage bin
106' Particular position of storage bin
107 Stack
108 Rail system/track system
110 Parallel rails in first direction (X)
110a First rail of neighboring rails 110
110b Second rail of neighboring rails 110
111 Parallel rails in second direction (Y)
111a First rail of neighboring rails 111
111b Second rail of neighboring rails 111
112 Grid column 115 Grid opening
119 First port column/first port
120 Second port column/second port
122 Grid cell/storage cell
201 Prior art single cell bin handling vehicle
201a Vehicle body of the bin handling vehicle 201
201b Drive means/wheel arrangement, first direction (X)
201c Drive means/wheel arrangement, second direction (Y)
301 Prior art cantilever bin handling vehicle
301a Vehicle body of the bin handling vehicle 301
301b Drive means in first direction (X)
301c Drive means in second direction (Y)
303 Gripping/engaging device
10A/10B Sub grids
12 Warehouse space
14 Bridge
16 Aisle
18 Fire wall
Opening in Firewall
22 Fire door
24 Door Rail
26 Angle (of door rail)
28 Dedicated delivery vehicle
Lower level
32 Access station
34 Operator
36 Opening in fire wall (lower level)
38 Fire door

The invention claimed is:

1. An automated grid storage and retrieval system comprising:
   a framework structure comprising a track system comprising a first set of parallel tracks arranged in a horizontal plane (P) and extending in a first direction (X), and a second set of parallel tracks arranged in the horizontal plane (P) and extending in a second direction (Y) which is orthogonal to the first direction (X), which first and second sets of tracks form a grid pattern in the horizontal plane (P) comprising a plurality of adjacent grid cells, each grid cell comprising a grid opening defined by a pair of neighboring tracks of the first set of tracks and a pair of neighboring tracks of the second set of tracks;
   a plurality of storage columns, each column being arranged to store a respective stack of storage bins, wherein the storage columns are located beneath the track system, wherein each storage column is located vertically below a grid opening;
   a plurality of bin handling vehicles that operate on the track system for collecting and returning the storage bins to and from the plurality of storage columns, and
   a control system for monitoring and controlling the automated storage and retrieval system, wherein the automated grid storage and retrieval system is arranged to be installed within a warehouse space into a plurality of sub grids,
   wherein adjacent sub grids of the plurality of sub grids are separated from each other by a fire wall, fire barrier or fire partition extending between the adjacent sub grids, and
   wherein the adjacent sub grids are co-joined by one or more bridges in the form of sections of track that pass through one or more openings in the fire wall, fire barrier or fire partition to allow the plurality of bin handling vehicles to pass from a grid-based track system of one sub grid to the grid-based track system of another sub grid, each opening in the fire wall, fire barrier or fire partition being provided with a fire door which is arranged to close off the opening in the fire wall, fire barrier or fire partition in event of a fire.

2. The automated grid storage and retrieval system according to claim 1, wherein an aisle is arranged between the adjacent sub grids and the fire wall, fire barrier or fire partition.

3. The automated grid storage and retrieval system according to claim 1, wherein each fire door is a slidable door, suspended from a door rail and held in an open position by a releasable latch or magnet, said door rail arranged at an angle whereby the fire door is configured to slide from an open position to a closed position under influence of gravity upon release of the latch or magnet.

4. The automated grid storage and retrieval system according to claim 1, wherein the system further comprises a plurality of dedicated container transport vehicles arranged at a ground level, said transport vehicles arranged to receive the storage bins from the grid cells and transport the storage bins though the one or more openings in the fire wall, fire barrier or fire partition to an access station.

5. The automated grid storage and retrieval system according to claim 1, wherein the one or more bridges are arranged with multiple tracks, such that the bin handling vehicles can pass simultaneously through an opening of the one or more openings in the fire wall, fire barrier or fire partition.

* * * * *